Dec. 10, 1929.  A. H. FRITZ ET AL  1,739,474

SKATE WHEEL

Filed July 25, 1928

Adolph H. Fritz  
Ernest J. Pardon  INVENTORS

BY

ATTORNEY

Patented Dec. 10, 1929

1,739,474

UNITED STATES PATENT OFFICE

ADOLPH H. FRITZ, OF LITCHFIELD, AND ERNEST J. PARDON, OF TORRINGTON, CONNECTICUT, ASSIGNORS TO UNION HARDWARE COMPANY, OF TORRINGTON, CONNECTICUT, A CORPORATION OF CONNECTICUT

SKATE WHEEL

Application filed July 25, 1928. Serial No. 295,136.

This invention relates to roller bearing wheels, especially to skate wheels for ball bearing roller skates, and has for its object to provide a simple and efficient construction which is rugged and inexpensive to produce.

Another object is to provide such a wheel made entirely of stamped metal and provided with only a single row of balls.

Heretofore, sheet metal parts have been suggested, in a skate wheel having a single row of balls but the transmission of lateral thrusts has generally necessitated so heavy and expensive a construction that the double row of balls has been a more common type of skate wheel. Under this invention, a strong construction is provided for a wheel having only the single row of balls but constructed entirely of sheet metal.

According to this invention, a double thickness of sheet metal is provided on all sides of the outer ball race as well as centrally of the inner ball race. Specifically, opposite telescopic members enclose a single row of balls laterally and on the outside, and these members are in turn enclosed by a symmetrical cup shaped members constituting the wheel shell or body portion. The inner ball race comprises contiguous cones held together by an expanded split sleeve.

Referring to the drawings.

Figure 1:
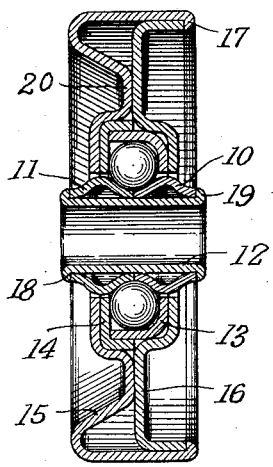
Fig. 1 is a section through a skate wheel embodying this invention.
Figure 2:
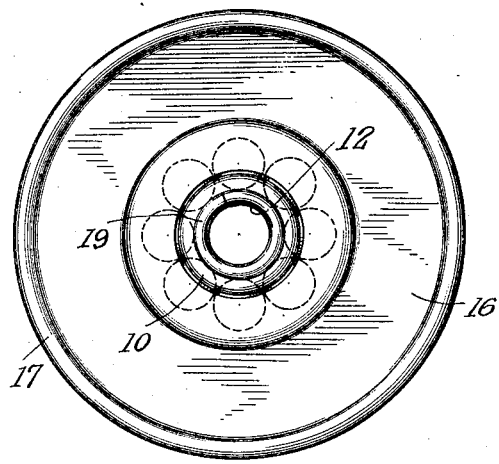
Fig. 2 is a side view of the skate wheel.
Figure 3:
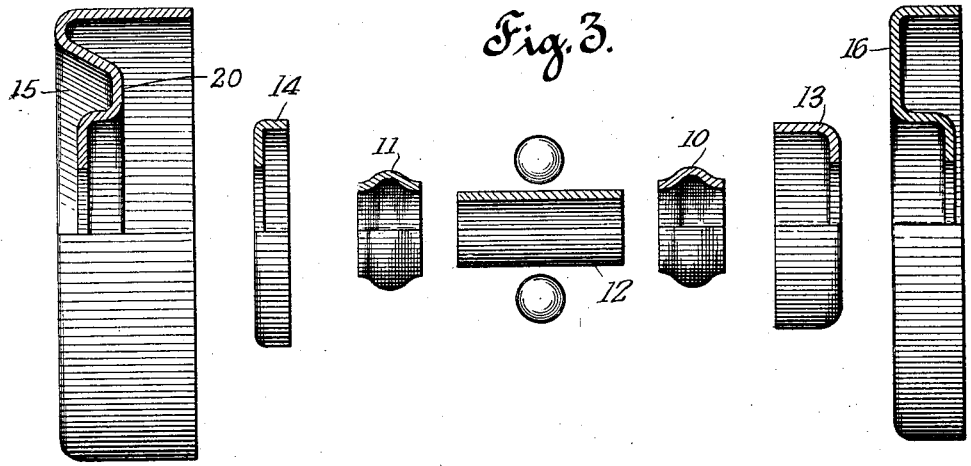
Fig. 3 is an exploded view showing the parts making up the wheel.

The inner ball race comprises a tubular member including the cones 10 and 11 which are held in the position shown, with their ends contiguous, by the expanded split sleeve 12. The seam between the contiguous cone edges may or may not be smoothed by soldering or welding, to lessen friction and wear on the balls. The outer ball race comprises the cup shaped members 13 and 14, which are of a size to oppositely telescope, as shown in Fig. 1. These cup shaped members are held together by the symmetrical cup shaped members 15 and 16 constituting the shell or body portion of the wheel and substantially enclosing the members 13 and 14. The edge of the shell member 15 is bent over at 17 to retain the cooperating or telescope shell portion 16 in position, clamping the inner cup members 13 and 14 together.

Each of the inner bearing members 10 and 11 may conveniently be formed of a steel tubing section compressed endwise so that it bulges outwardly at the centre.

The central member 12 is preferably a tube formed of sheet metal and has its ends upset or bent over at 18 and 19 to hold the bearings in place.

The parts of the outer bearing members may be assembled first and then the balls inserted and the cones 10 and 11 inserted from opposite sides and secured together by the tube or sleeve 12. The webs 16 and 20 may be secured together by riveting or welding.

Or it may be found desirable to assemble the parts of the inner ball race, then bring one of the shell members and its contiguous outer ball race portion into place around the inner race or hub part, place the balls in position and then put the cooperating outer ball race member in position and finally bring the cooperating shell members in place.

An advantage of this construction will be seen to reside in the double walled construction of the outer ball race, whereby the metal parts constituting this race will not be likely to spread when in use. Any lateral thrust is then transmitted to the cones 10 and 11 and to the sleeve 12 through its upset ends 18 and 19. Another desirable feature of this construction is the location of the webs of the shell members in substantial alignment with the center of the balls so that this member is adapted to stand substantial pressure from the wheel rim with little tendency to spread it being reinforced by the contiguous portions 16 and 20 of the shell members.

We claim:

1. A ball bearing roller skate wheel comprising a single row of balls and at least two sheet metal walls on each side and on the outside of said balls, and an inner ball race comprising at least two thicknesses of sheet metal inside the balls and centrally thereof.

2. A skate wheel comprising two shell members having a tread, coacting webs reinforcing each other and spaced flanges for an outer ball race, and an inner bearing comprising a pair of upset tubular cone members and an interior reinforcing and connecting sleeve together with a single row of balls mounted between said cone members and said flanges.

3. A skate wheel comprising a tubular member having inner bearing cones secured thereon and with a single ball race around the central part, two cup-shaped outer bearing members having telescoping flanges, balls arranged in said ball race between said outer bearing members, and two outer shell members having flanges reinforcing said outer bearing members and one of said shell members having a tread portion interlocked with the outer edge of the other shell member.

4. A wheel comprising two shell members having telescoping peripheral flanges and spaced inner flanges, bearing cups secured between said inner flanges and having telescoping flanges, an inner bearing comprising tubular members having a ball race between them, balls in said race between said bearing cups, and means for securing said tubular members together.

5. A skate wheel comprising a shell having telescopic cup shaped members provided with outer overlapping flanges forming a tread portion and inner flanges forming a housing, cup shaped members mounted on said housing and having overlapping lateral flanges, said latter cup shaped members forming the outer ball race, a tubular member passing through said cup shaped members, a pair of expansible cone members mounted on said tubular member, said cone members formed with intermediate bulge portions providing the inner ball race and balls in said race, the inner ends of said cone members being contiguous and the outer ends thereof being adapted to engage the upturned ends of said tubular member.

6. A ball bearing wheel having a shell comprising a symmetrical telescopic cup shaped members enclosing oppositely telescopic cup shaped members forming the outer ball race, a split tubular member extending through said cup shaped members, a pair of sleeves mounted on said tubular member, said sleeves formed with bulges midway their length forming the inner ball race, balls in said race and a flange formed on the outer ends of said tubular member, the inner ends of said sleeves abutting against each other and the outer ends abutting against said flanges.

7. A ball bearing wheel comprising a central sleeve, a pair of upset tubular cone members, each having its ends supported on said sleeve and having a ball race between them, a series of balls in said ball race and outer bearing members enclosing said balls.

8. A ball bearing wheel comprising a central supporting member, separate upset sheet metal cone members abutting against each other and with both ends of each supported on said supporting member and with a raceway between the upset portions of said cone members, a series of balls in said raceway and outer bearing members enclosing said balls.

ADOLPH H. FRITZ.
ERNEST J. PARDON.